(12) United States Patent
O'Brien et al.

(10) Patent No.: US 7,505,574 B2
(45) Date of Patent: Mar. 17, 2009

(54) METHOD AND SYSTEM FOR PROVIDING AN IMPROVED COMMUNICATIONS CHANNEL FOR TELEPHONE CONFERENCE INITIATION AND MANAGEMENT

(75) Inventors: Robert R. O'Brien, Kirkland, WA (US); John T. Wilcox, Redmond, WA (US); Garry D. Gross, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1038 days.

(21) Appl. No.: 10/811,325

(22) Filed: Mar. 26, 2004

(65) Prior Publication Data
US 2005/0213724 A1    Sep. 29, 2005

(51) Int. Cl.
*H04M 3/42* (2006.01)

(52) U.S. Cl. .................. 379/202.01; 370/352; 370/360; 455/413

(58) Field of Classification Search ............ 379/202.01; 705/1; 370/352, 360; 455/413
See application file for complete search history.

(56) References Cited

U.S. PATENT DOCUMENTS

| | | | |
|---|---|---|---|
| 6,584,185 B1 | 6/2003 | Nixon | 379/201.01 |
| 6,584,505 B1 | 6/2003 | Howard et al. | 709/225 |
| 6,650,735 B2 | 11/2003 | Burton et al. | 379/88.01 |
| 6,651,251 B1 | 11/2003 | Shoff et al. | 725/37 |
| 6,674,767 B1 | 1/2004 | Kadyk et al. | 370/466 |
| 2003/0185369 A1* | 10/2003 | Oliver et al. | 379/202.01 |
| 2005/0187781 A1* | 8/2005 | Christensen | 705/1 |
| 2005/0238156 A1* | 10/2005 | Turner | 379/202.01 |

OTHER PUBLICATIONS

Schneier, Bruce, "Marriage of Phone Services, Biz Apps Could Be A Security Risk," Secure Technology/Technology Information, *InternetWeek*, Jul. 9, 2001.

Jones, Timothy, "I'm Just Trying To Find The Bridge," Technology Information, *Teleconnect*, vol. 18, No. 9, Sep. 2000, p. 62.

"Ameritech Offers Guaranteed Conference Calling In An Instant—Meet By Phone When You Want, Without Advance Reservations," Company Business and Marketing, Cambridge Telecom Report, NA, Jul. 12, 1999.

Lim, Hee Jin; Choi, Go Bong, "Application of INAP To AIN Intelligent Peripheral," Services and Visualization Towards User-Friendly Design: Selected Papers: Lecture Notes in Computer Science, vol. 1385, 1998, pp. 278-290.

Liang, Lung-Sing; Cheng, Shyr-Yuan; Chu, Yu-Huang; Wen, Sung-Hua; Hsu, Nai-Bin; Hsia, Yon-San; Wu, Cia-Sheng; Chang, Chung-Jen, "Design, Implementation and Performance Measurement of Multi-Point Video-Conference Bridge (MPVCB) Over ATM Switch," SUPERCOMM/ICC '94, 1994 IEEE International Conference On Communications ICC '94, New Orleans, USA, vol. 3, May 1-5, 1994.

Menkus, Belden, Why Not Try "Audio Teleconferenging"? *Modern Office Technology*, Oct. 1987, vol. 32, pp. 124-126.

* cited by examiner

*Primary Examiner*—Gerald Gauthier
(74) *Attorney, Agent, or Firm*—Merchant & Gould (57) ABSTRACT

Methods and systems for providing an improved communications channel for telephone conference initiation and management are provided. Messages for initiating and managing a telephone conference are exchanged between a client computer and a gateway computer utilizing XML formatted messages transmitted over an instant messaging compatible protocol. The gateway computer converts the messages to web services requests and communicates with telephone conference network hardware utilizing the web services-based request. Status indicators from the telephone conference equipment is converted from web services requests to XML by the gateway and transmitted back to the client computer via the instant messaging protocol.

20 Claims, 10 Drawing Sheets

METHOD AND SYSTEM FOR PROVIDING AN IMPROVED COMMUNICATIONS CHANNEL FOR TELEPHONE CONFERENCE INITIATION AND MANAGEMENT

TECHNICAL FIELD

The invention generally relates to the field of telephone conferences and, more specifically, to the field of establishing and utilizing an improved data communications channel for initiating and managing telephone conferences.

BACKGROUND OF THE INVENTION

Telephone conferences, also referred to herein as conference calls, allow two or more individuals to participate in a telephone conversation together. The actual telephone calls between the various participants are typically placed by a telephone network device called a conference bridge. The conference bridge is responsible for connecting each of the telephone conference participants, mixing audio from each of the telephone calls, performing billing functions, and other tasks.

Telephone conferences are often managed utilizing a telephone or world wide web-based interface to the conference bridge through which the phone numbers of the various parties and other information may be provided. However, these interfaces can be difficult to use and are typically helpful only for scheduled conference calls. Because of the complexity of setting up a telephone conference, these types of interfaces are not generally appropriate for impulse-type conference calls. For instance, if an electronic mail message has been circulated to a number of individuals, it would be very time consuming to utilize a web- or telephone-based interface to a telephone conference system to initiate a telephone conference between all of the recipients of the mail message.

In order to provide an improved interface for initiating an impulse-type telephone conference, desktop application software executing on a computer system may be utilized to initiate the conference call. For instance, in the example described above, the electronic mail message itself may be utilized as a starting point for initiating the telephone conference. In particular, if a telephone number can be obtained for each of the mail recipients, it may be possible to transmit electronic data to a conference bridge requesting that a telephone conference be initiated between each of the participants immediately.

In order to initiate an exchange of data between a desktop application program and a remote conference bridge, a number of technical hurdles must be overcome. First, it is necessary for a secure asynchronous connection between the desktop application program and the conference bridge to be established. However, establishing a secure asynchronous communications channel among devices across network hops and firewalls has often been a challenge. In order to be effective, the communications channel between the desktop and the conference bridge should support the traversal of 1-N network hops and/or unmanaged firewalls and/or network address translation ("NAT") devices and/or HTTP proxy devices. Moreover, communications from both the desktop application program and the conference bridge should be authenticated to ensure that unauthorized access cannot be had to the conference bridge. Additionally, all communication between the desktop application program and the conference bridge should be logged.

It is with respect to these considerations and others that the various embodiments of the present invention have been made.

SUMMARY OF THE INVENTION

In accordance with the present invention, the above and other problems are solved by a method and system for providing an improved communications channel for telephone conference initiation and management. Aspects of the invention provide an improved communications channel for initiating and managing a telephone conference from within desktop application software. According to aspects of the invention, the improved communications channel can support the traversal of any number of network hops, unmanaged firewalls, network address translation devices, and HTTP proxy devices. Additionally, aspects of the invention allow all communications traffic to be authenticated and logged.

According to one aspect of the invention, a system for providing and utilizing an improved communications channel for establishing and maintaining a telephone conference is provided. According to various aspects of the invention, the system may include a client application program for execution on a client computer. The client application program may operate in conjunction with a personal information manager application program, an instant messaging application program, or other type of desktop software. In particular, the client application program may receive a request to initiate a telephone conference between two or more participants. In response to receiving such a request, the client application program is operative to generate and transmit an instant message to an instant messaging server computer. The instant message includes data necessary for initiation of the telephone conference such as the telephone number of the initiator of the conference. It might also contain information about the current user so that the conferencing provider can both bill for the call as well as know which bridge account to use to place the call. According to aspects of the invention, the instant message may comprise extensible markup language ("XML") expressed utilizing the simple object access protocol ("SOAP"). Moreover, the instant message may be transmitted from the client computer to the instant messaging server computer utilizing the session initiation protocol ("SIP").

In order for the client application program to successfully transmit the instant message to the instant messaging server computer, the client application program must be authenticated. Moreover, because the SIP protocol is utilized to communicate with the instant messaging server computer, any firewall devices interposed between the client computer and the instant messaging server computer will not interfere with the communication. Additionally, the instant messaging server computer may be utilized to log all communication to and from the client application program.

According to aspects of the invention, the system includes a gateway application program for executing on a telephone conference gateway computer. The gateway application program is operative to register with the instant messaging server computer as a recipient for instant messages. In particular, the gateway computer may receive instant messages such as those generated by the client computer requesting that a telephone conference be initiated. When the gateway application program receives such an instant message, the gateway application program is operative to extract from the instant message the data requesting that the telephone conference be established.

Based on the data contained in the instant message, the gateway application program is also operative to generate a web services request. The web services request provides an interface to a proprietary mechanism for communicating with a telephone conference bridge. Once the web services request has been established, the gateway application program is operative to transmit the web services request to a network device capable of establishing the telephone conference. In particular, the web services request may be sent to a proprietary back-end interface for communicating with a conference bridge.

In response to receiving the web services request, the back-end program code is operative to cause the conference bridge to establish a telephone conference in the manner described within the data contained in the instant message. For instance, the conference bridge may place a telephone call over the public switched telephone network ("PSTN") to the initiator of the telephone conference. Subsequent instant messages may be transmitted to add additional participants to the call, to remove participants from the call, or to perform other functions.

It should be appreciated that according to aspects of the invention, messages transmitted between the client application program and the instant messaging server computer are formatted according to the SIP protocol. Moreover, the data payload of these messages is expressed as XML formatted utilizing SOAP. It should also be appreciated that, according to other aspects of the invention, communications between the instant messaging server computer and the gateway application program are also formatted according to the SIP protocol. Additionally, it should be appreciated that messages transmitted between the gateway application program and the network device capable of establishing a telephone conference comprise web services requests.

According to other aspects of the invention, messages may be relayed from the conference bridge to the client application program via the improved communications channel. In particular, messages generated by the conference bridge are received by the proprietary back-end software. Based on the receipt of these messages, a web services call is made to the telephone conference gateway computer. The telephone conference gateway computer is then operative to package the request as a SIP-formatted message utilizing XML, and to transmit the instant message to the instant messaging server computer. The instant messaging server computer is then operative to relay the instant message to the client application program. In this manner, a message is generated by a conference bridge, such as those generated when a participant has answered a telephone call or exited from a telephone conference, may be relayed from the conference bridge to the client application program through the improved communications channel. It should be appreciated therefore, that the communications channel provided by the invention described herein comprises a two-way, asynchronous, secure, authenticated, logged communications channel capable of traversing virtually any network device.

According to aspects of the invention, a method for providing and utilizing an improved communications channel for establishing and maintaining a telephone conference is provided. According to the method, a request is received at a client computer to initiate a telephone conference between two or more participants. In response to the request, an instant message is transmitted to an instant messaging server computer that includes data for establishing the telephone conference between the participants. When the instant message is received at the instant messaging server computer, the instant message is forwarded to a telephone conference gateway computer. The instant message is then received by the telephone conference gateway computer, which extracts from the instant message the data for establishing the telephone conference. Based on the data, the gateway computer creates a web services request and transmits the web services request to an interface to a network device capable of establishing the telephone conference.

According to aspects of the method, the instant message may comprise a message formatted according to the SIP protocol. Moreover, the instant message may comprise XML data formatted according to the SOAP protocol. Additionally, the instant messaging server computer may be operative to authenticate the client computer and the telephone conference gateway computer prior to transmitting or receiving messages from either of these devices.

According other aspects of the invention, the telephone conference gateway may receive an indication from the network equipment that a telephone call has been placed to one of the participants and that the telephone call is in a ringing state. This indication may be provided to the gateway computer as a web services request. In response to receiving such a request, the gateway computer converts the indication to an instant message, including data indicating that the call is in a ringing state. As discussed above, the instant message may comprise XML formatted using SOAP and may be transmitted it to the instant messaging computer over the SIP protocol. When the instant message is received at the instant messaging server computer, the message may be forwarded to the client computer. At the client computer, the data within the instant message indicating that the call is in a ringing state may be extracted and displayed to a user to thereby indicate that the call is in a ringing state.

According to other aspects of the invention, an indication may be received at the telephone conference gateway computer that the call has been answered by one of the participants. This request may be generated as a web services request. The indication that the telephone call has been answered may be converted to an instant message at the telephone conference gateway and transmitted to the instant messaging server computer. The instant messaging server computer may then forward the message to the client computer where the message may be decoded and data may be displayed indicating that the call has been answered by one of the participants.

According to other aspects of the invention, a request may be received at the client computer to disconnect one or more of the participants from the telephone conference. In response to the request, the client computer is operative to package and transmit an instant message including data requesting that the participant be disconnected from the telephone conference to an instant messaging server computer. The instant messaging server is operative to authenticate the message and to transmit the message to the gateway computer. When the message is received at the gateway, the data requesting that a participant be disconnected may be extracted from the message and a web services request may be created based on the data. The web services request may then be executed at an interface to the network equipment to thereby disconnect the participant.

According to other aspects of the invention, the telephone conference gateway computer may receive an indication from the network equipment that a participant has disconnected from the telephone conference. This indication may be received at the gateway computer as a web services request. In response to receiving such an indication, the gateway computer is operative to create an instant message including data indicating that the participant has disconnected from the telephone conference. The gateway computer is also operative to transmit the instant message to the instant messaging server computer. The instant messaging server computer is then operative to transmit the message to the client computer where the message is decoded and where data is displayed indicating that the participant has disconnected from the telephone conference.

Other aspects of the invention include an apparatus for providing and utilizing an improved communications channel that comprises a computer for executing a client application program. According to this aspect of the invention, the application program is operative to transmit an instant message to an instant messaging server computer. The instant message may include data requesting that a telephone conference between one or more participants be established. Moreover, the instant message may be formatted according to the SIP protocol and include XML data formatted according to the SOAP protocol.

Other aspects of the invention include an apparatus for providing and utilizing an improved communication channel for establishing and maintaining a telephone conference that includes a computer for executing a gateway application program. According to this aspect of the invention, the gateway application program is operative to receive an instant message from an instant messaging server computer. The gateway application program is also operative to extract from the instant message data requesting that a telephone conference be established. The gateway application program is further operative to create a web services request based on the data and to transmit the web services request to a network device capable of establishing the telephone conference.

The invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
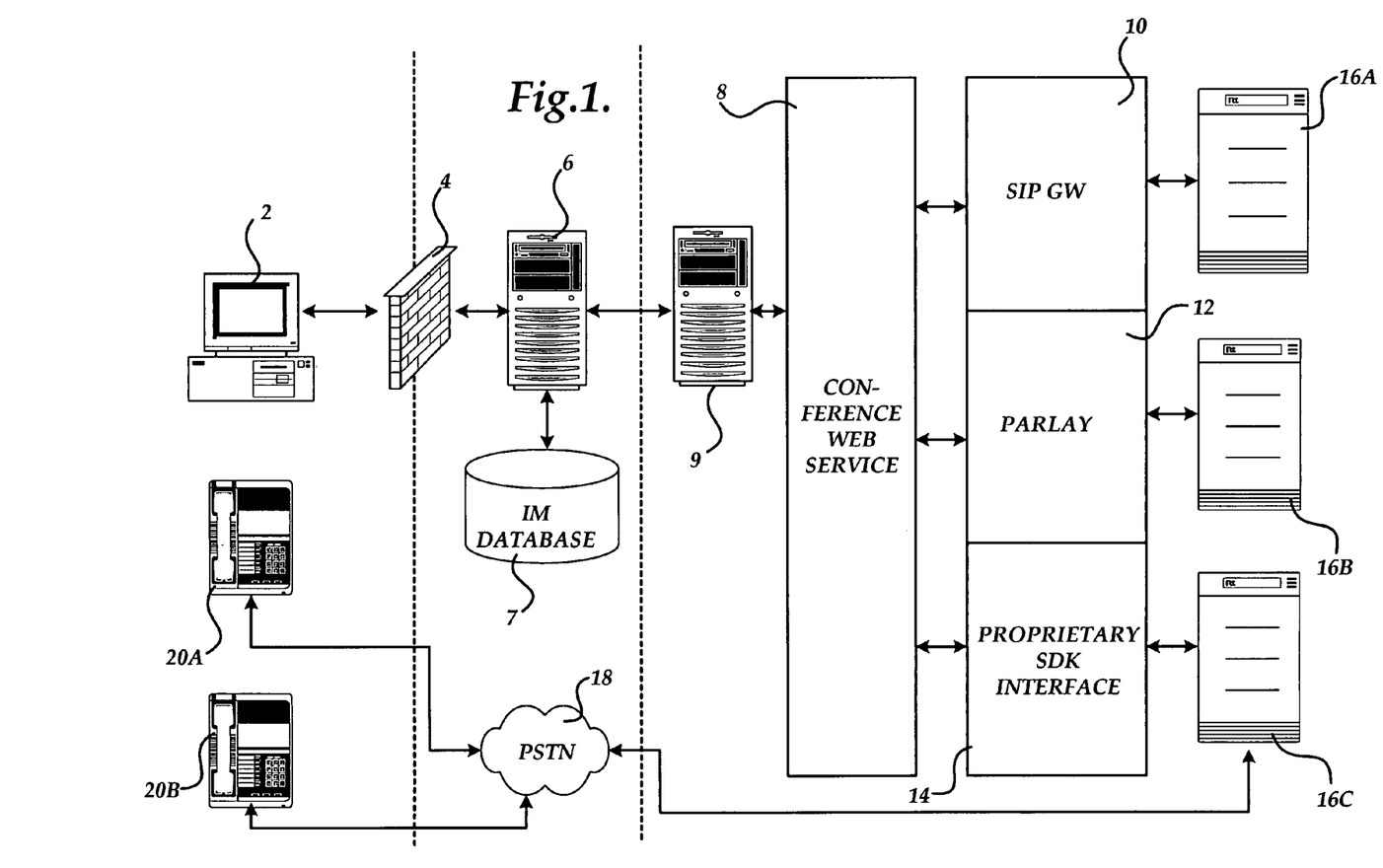
FIG. 1 is a network architecture diagram illustrating a number of network components utilized in the various embodiments of the present invention.

Turning now to FIG. 1, a number of network components utilized in the various embodiments of the invention will be described. As shown in FIG. 1, a client computer 2 may be connected to the Internet or other type of network. A firewall 4 may be interposed between the client computer 2 and an external network. The client computer 2 is operative to execute application program software for initiating and managing a telephone conference. As will be discussed in greater detail below, application program software executes on the client computer 2 that allows a user to initiate a telephone conference between two or more participants and to manage the call. In particular, the status of each of the participants may be displayed, participants may be added or disconnected, the call may be ended, and other tasks may be performed.

In order to provide this functionality, the client computer 2 includes program code for supporting the use of the SIP protocol to communicate with an instant messaging ("IM") server computer 6. In particular, the client computer 2 may register with the IM server computer 6 as a user of an instant messaging service. With regard to the telephone conference functionality, the client computer 2 is operative to transmit to the IM server computer 6 instant messages that include commands for initiating and managing the telephone conference. The instant messages may be expressed using XML formatted as SOAP requests. The instant messages, as described above, may be transmitted to the IM server computer 6 utilizing the SIP protocol or other similar protocols for the exchange of instant messages.

The IM server computer 6 is operative to execute an IM server application program that facilitates the exchange of messages between instant messaging users. In this regard, the IM server computer 6 is operative to maintain an IM database 7. Among other things, the IM database 7 includes the identities of users authorized to utilize the IM server computer 6 and a log of messages between the users of the IM server computer 6.

According to embodiments of the invention, a telephone conference gateway computer 9, also referred to herein as the "gateway computer 9", may be utilized. The gateway computer 9 is operative to register with the IM server computer 6 for the receipt and transmission of instant messages. It should be appreciated that communication between the IM computer 6 and the gateway computer 9 is also established utilizing the SIP protocol or other protocol for the establishment of communications in an IM environment.

When the IM server computer 6 receives an instant message from the client computer 2 for initiating a telephone conference, the IM server computer 6 is operative to forward the message to the gateway computer 9. When the gateway computer 9 receives the message, the gateway computer 9 is operative to extract from the instant message the XML formatted SOAP request and to convert the SOAP request into a web services request. The gateway computer then can execute the web services request by calling the conference web service 8.

The conference web service 8 provides an external web services interface to the gateway computer 9. The conference web service 8 also provides an interface to proprietary back-end software for interfacing with a conference bridge. As shown in FIG. 1, the conference web service 8 may provide an interface to a SIP interface 10 for communicating with the conference bridge 16A, to a parlay interface 12 for communicating with the conference bridge 16B, and to any other proprietary interface 14 for communicating with the conference bridge 16C.

In the case of a request to add a participant to a conference call, the gateway computer 9 is operative to generate a web request to the conference web service 8 to add the participant. In turn, the conference web service 8 interfaces with the proprietary code 14 to make the appropriate request to the conference bridge 16C. In turn, the conference bridge 16C is operative to place a telephone call over the PSTN 18 to the appropriate telephone 20A. It should be appreciated that any number of participants may be added to a telephone conference by making a number of simultaneous such requests. For instance, another participant may be called by the conference bridge 16C over the PSTN 18 on the telephone 20B. The calls to the telephones 20A and 20B may be mixed by the conference bridge 16C to create a telephone conference.

It should be appreciated that, according to the various embodiments of the invention, communication between the client computer 2 and the instant messaging server computer 6 are made utilizing the SIP protocol. Likewise, communications between the IM server computer 6 and the gateway computer 9 are also made utilizing the SIP protocol. It should further be appreciated that communication between the gateway computer 9 and the conference web service 8 are made utilizing web service calls, that may be formatted according to the industry standard web service interface definition.

It should also be appreciated that status information may be returned asynchronously from the conference bridges 16A-16C to the client computer 2. For instance, if a participant in a conference call hangs up the telephone, a message will be generated at the particular conference bridge and returned to the proprietary interface 14. In response to receiving such an indication, the conference web service 8 makes a web service request to the gateway computer 9 indicating that the participant has exited the telephone conference. In response to receiving such a web service request, the gateway computer 9 is operative to format the data contained in the request as an XML message and to transmit the message to the instant messaging server computer 6 utilizing the SIP protocol. In turn, the instant messaging server computer 6 is operative to transmit the message to the appropriate client computer 2, where the data contained therein may be decoded and displayed to a user of the client computer 2 as a status message. In this manner, any status information may be returned from the conference bridges 16A-16C to the client computer 2, such as the progress of a call, a busy signal, the completion of a call, the departure of one of the participants in the conference call, or other status information. Additional details regarding the various components illustrated in FIG. 1 will be described below with reference to FIGS. 2-10.

Figure 2:
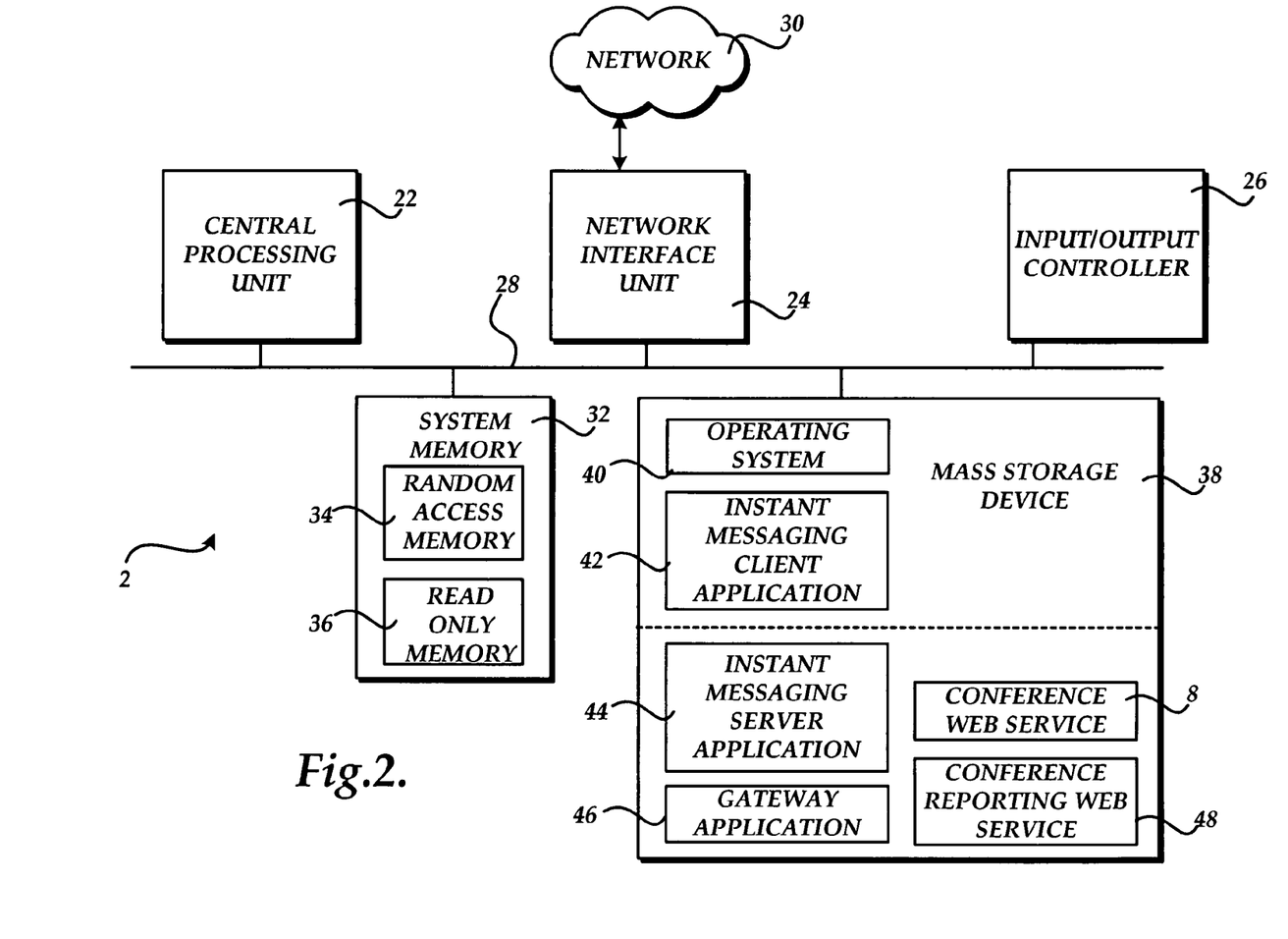
FIG. 2 is a computer system architecture diagram illustrating a computer system utilized in and provided by the various embodiments of the invention.

Referring now to FIG. 2, an illustrative computer architecture for a computer 2 utilized in the various embodiments of the invention will be described. The computer architecture shown in FIG. 2 illustrates a conventional desktop or laptop computer, including a central processing unit 22 ("CPU"), a system memory 32, including a random access memory 34 ("RAM") and a read-only memory ("ROM") 36, and a system bus 28 that couples the memory to the CPU 22. A basic input/output system containing the basic routines that help to transfer information between elements within the computer, such as during startup, is stored in the ROM 36. The computer 2 further includes a mass storage device 38 for storing an operating system 40, application programs, and other program modules, which will be described in greater detail below.

The mass storage device 38 is connected to the CPU 22 through a mass storage controller (not shown) connected to the bus 28. The mass storage device 38 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 30, such as the Internet. The computer 2 may connect to the network 30 through a network interface unit 24 connected to the bus 28. It should be appreciated that the network interface unit 24 may also be utilized to connect to other types of networks and remote computer systems. The computer 2 may also include an input/output controller 26 for receiving and processing input from a number of other devices, including a keyboard, mouse, or electronic stylus (not shown in FIG. 2). Similarly, an input/output controller 26 may provide output to a display screen, a printer, or other type of output device.

As mentioned briefly above, a number of program modules and data files may be stored in the mass storage device 38 and RAM 34 of the computer 2, including an operating system 40 suitable for controlling the operation of a networked personal computer, such as the WINDOWS XP operating system from MICROSOFT CORPORATION of Redmond, Wash. The mass storage device 38 and RAM 34 may also store one or more program modules. In particular, the mass storage device 38 and the RAM 34 may store an instant messaging client application 42 for communicating with the IM server computer 6. As known to those skilled in the art, the instant messaging client application 42 allows a user of the client computer 2 to exchange messages with another instant messaging user in near real time.

According to the embodiments of the invention, the IM client application 42 also exposes functionality for communicating with the IM server computer 6 to other applications. This functionality may be utilized by other applications to transmit messages for initiating, monitoring, and managing a telephone conference. It should be appreciated that the client computer 2 may also execute other types of application programs, such a personal information manager or a program dedicated to initiating and managing telephone conferences. As will be described in greater detail below with reference to FIG. 3, in the various embodiments of the invention a telephone conference may be initiated through functionality provided by a personal information manager and utilizing the functionality exposed by the IM client application 42 for communicating with the IM server computer 6.

It should be appreciated that the IM server computer 6, the gateway computer 9, and the various other computers utilized in the embodiments of the invention may include the conventional components illustrated in FIG. 2 and described above with respect to the client computer 2. Additionally, the IM server computer 6 may execute an IM server application 44. In one embodiment, the IM server application 44 comprises the MICROSOFT OFFICE LIVE COMMUNICATIONS SERVER from MICROSOFT CORPORATION. It should be appreciated that other instant messaging server applications may be utilized.

The gateway computer 9 may execute a gateway application program 46 for receiving instant messages from the IM server commuters 6 and for converting received messages to a web services interface compatible with the conference web service 8. The gateway computer 9 may also execute a conference reporting web service 48 for receiving data from the conference web service 8 formatted as web service requests and for converting the received data to instant messages compatible with the IM server computer 6. It should be appreciated that other computer systems may also be utilized to execute the conference web service 8. As described herein, the conference web service 8 exposes a web services-based interface to the gateway computer 9 for accessing functionality provided by the proprietary interfaces 10, 12, and 14. It should be appreciated that these computer systems may also execute other types of programs and operating systems known to those skilled in the art.

Figure 3:
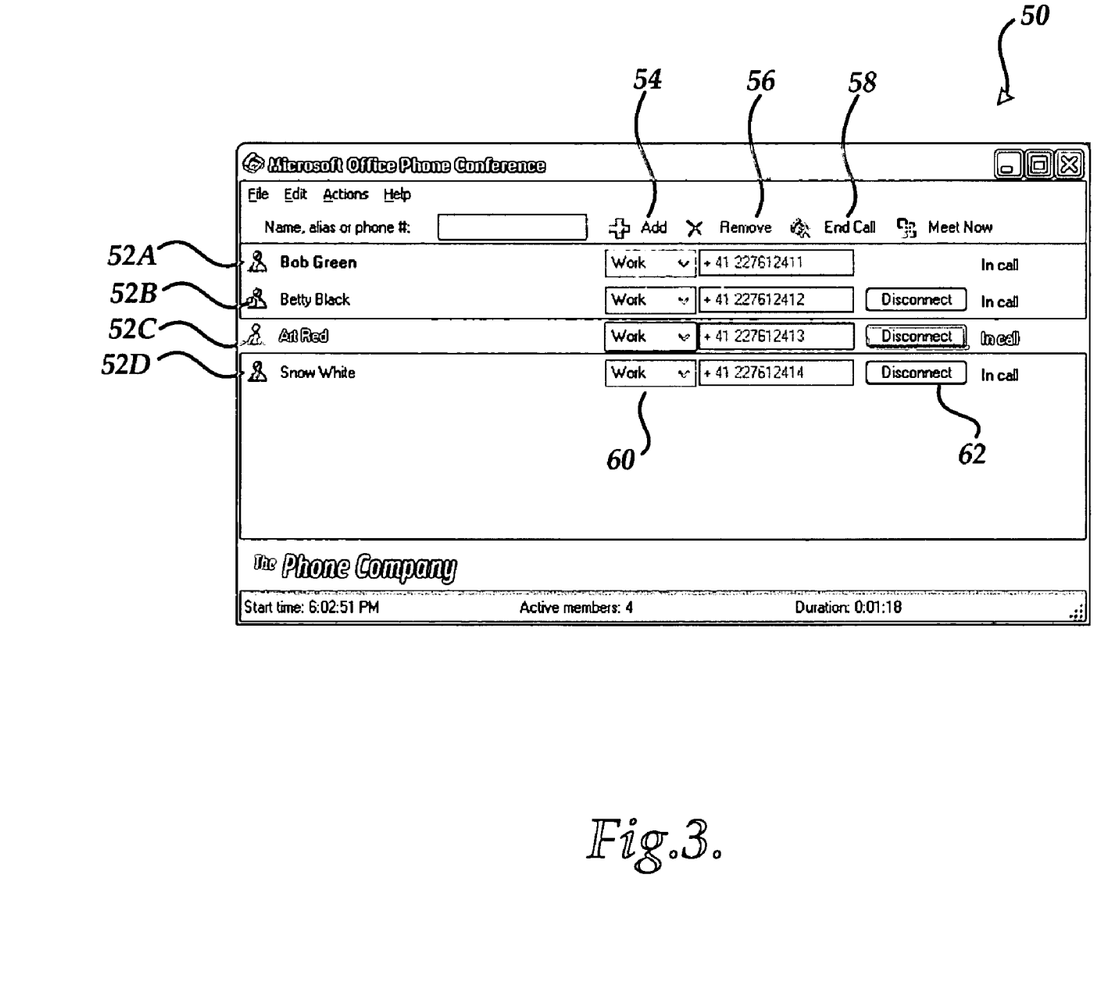
FIG. 3 is a user interface diagram illustrating an illustrative interface for initiating a telephone conference according to one embodiment of the invention.

Turning now to FIG. 3, an illustrative user to interface 50 will be described for initiating and managing a telephone conference. As described briefly above, in one embodiment of the invention, an electronic mail message may be displayed by a personal information manager application program. As part of the user interface provided with the e-mail message, a user interface button may be provided for initiating a telephone conference between each of the individuals to whom the e-mail message was addressed. When selected, the user interface dialog box shown in FIG. 3 will be displayed.

As shown in FIG. 3, the user interface 50 includes a roster that identifies each of the participants 52A-52D. For instance, participant 52A is identified as the initiator and owner of the conference and provides information about where the owner should be called. The user interface 50 also is populated with additional data for each of the users obtained from the personal information manager software or an external directory service. In particular, presence information may be displayed for each participant indicating whether the individual is currently connected to the IM server computer 6 utilizing an instant messaging application program. A drop-down menu 60 may also be provided for each participant indicating the location at which an attempt should be made to connect the individual to the telephone conference. For instance, the drop-down menu 60 may identify an individual's work, home, cell phone, or other location at which an attempt should be made to add the participant to the telephone conference.

Additionally, a user interface button 62 may be provided for connecting each participant to the call individually. When the participant is currently participating in the call, the user interface button 62 may be utilized to disconnect an individual participant from the conference call. According to embodiments of the invention, a user interface button 54 is provided for adding additional individuals to the telephone conference. The text box to the left is where a user can insert a name and click the button 54. The application 42 then resolves the text against any existing address books connected to the application software 42. If no text is entered, the application brings up the address book. If duplicate entries are found during the resolution of the name, the entries are aggregated together to form one entry in the list. For example, if there is a "Robert O'Brien" in the contacts list with a mobile number, an e-mail address of robertob@test123.com, and an entry in the Microsoft Global Address Box for "Robert O'Brien" with an e-mail address of robertob@abcd.com and an office phone number, then one entry will be added to the list with both an office phone number as well as a mobile number. A user interface button 56 may be also provided for removing an individual from the roster. A user interface button 58 may also be provided for quickly disconnecting each of the participants from the telephone conference.

As will be described in greater detail below, the user interface 50 shown in FIG. 3 may be utilized to add or remove individuals from the telephone conference and may be utilized to display status information regarding the progress of the call. For instance, when a new participant is added to the telephone conference, status information may be displayed indicating a ringing or busy status of the participant's telephone line, data may be displayed indicating that an individual is in the call, or data may be displayed indicating that an individual has left the call. In order to provide this functionality, the application program underlying the user interface 50 is operative to transmit and receive messages from the instant messaging server computer 6 regarding the initiation, status, and management of the telephone conference. Additional details regarding the type and content of messages transmitted to and from the client computer 2 will be described in greater detail below with reference to FIGS. 4-10.

Figure 4:
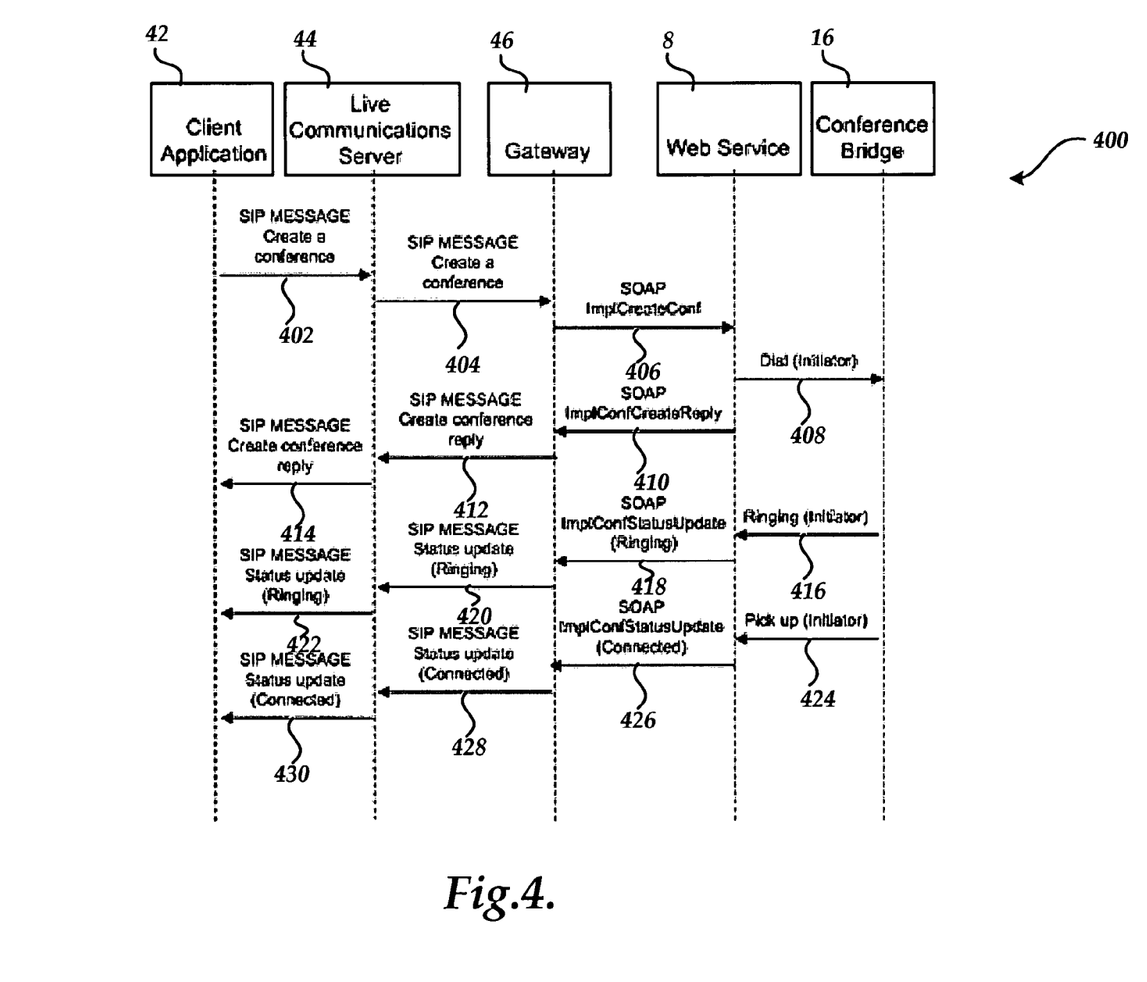
FIGS. 4-10 are process diagrams illustrating various aspects of the invention for initiating and managing a telephone conference over an improved communications channel according to the various embodiments of the invention.

Referring now to FIG. 4, a routine will be described for implementing and utilizing an improved communication channel for initiating and managing a telephone conference. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 4-10, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as received within the claims attached hereto.

FIG. 4 illustrates a process 400 for creating a new telephone conference. As shown in FIG. 4, a request may be received at the IM client application 42 to create a telephone conference. For instance, as described above with reference to FIG. 3, a request may be made through the user interface 50 to create a telephone conference with two or more participants. In response to such a request, a message is transmitted from the IM client application 42 to the IM server application 44 at operation 402. As discussed above, the message comprises an XML message formatting utilizing the SOAP protocol and transmitted over the SIP instant messaging protocol.

The IM server application 44 receives the message from the IM client application 42 and forwards the message at operation 404 to the gateway application 46. The gateway application 46 then extracts from the message the XML formatted SOAP data and converts the data to a web services request. The web services request is transmitted to the conference web service 8 at operation 406. In response to receiving the request, the conference web service 8 transmits a dial request to the conference bridge 16 at operation 408.

At operation 410, the conference web service 8 returns to the gateway application 46 an indication that the conference creation is underway. The gateway application 46 converts the message received from the gateway to an SIP message at operation 412, and transmits the message to the IM server application 44. At operation 414, the IM server application 44 transmits the reply to the IM client application 42. A status message may then be displayed to the user indicating that creation of the conference is underway.

In order to create the conference, the conference bridge 16 places a telephone call over the PSTN to the initiator of the telephone conference. When the call has been placed, the conference bridge 16 transmits a ringing indicator to the conference web service 8 at operation 416. The conference web service 8 receives the indicator and calls the conference reporting web service 48 executing on the gateway computer 9 with the indicator. The conference reporting web service 48 converts the indicator to an SIP message and transmits the message to the IM server application 44 at operation 420. The IM server computer 44 then relays the message to the client application 42 at operation 422. The IM client application 42 may then display an indicator to the initiator of the telephone conference that the call is ringing.

When the initiator of the telephone conference answers the telephone call, the conference bridge 16 transmits a message to the web service 8 at operation 424. The web service 8 calls the conference reporting web service 48 executing on the gateway computer 9 at operation 426. The gateway computer 9 converts the web services request to an SIP message and relays the message to the IM server application 44 at operation 428. Logging may then be performed. The IM server application 44 then transmits the message to the client application 42 at operation 430. The IM client application 42 may then extract from the SIP message the data indicating that the call has been answered and display an indication to the user that the call has been answered. Once the initiator has been added to the conference call, other participants may be added in the manner described below with reference to FIG. 5.

Figure 5:
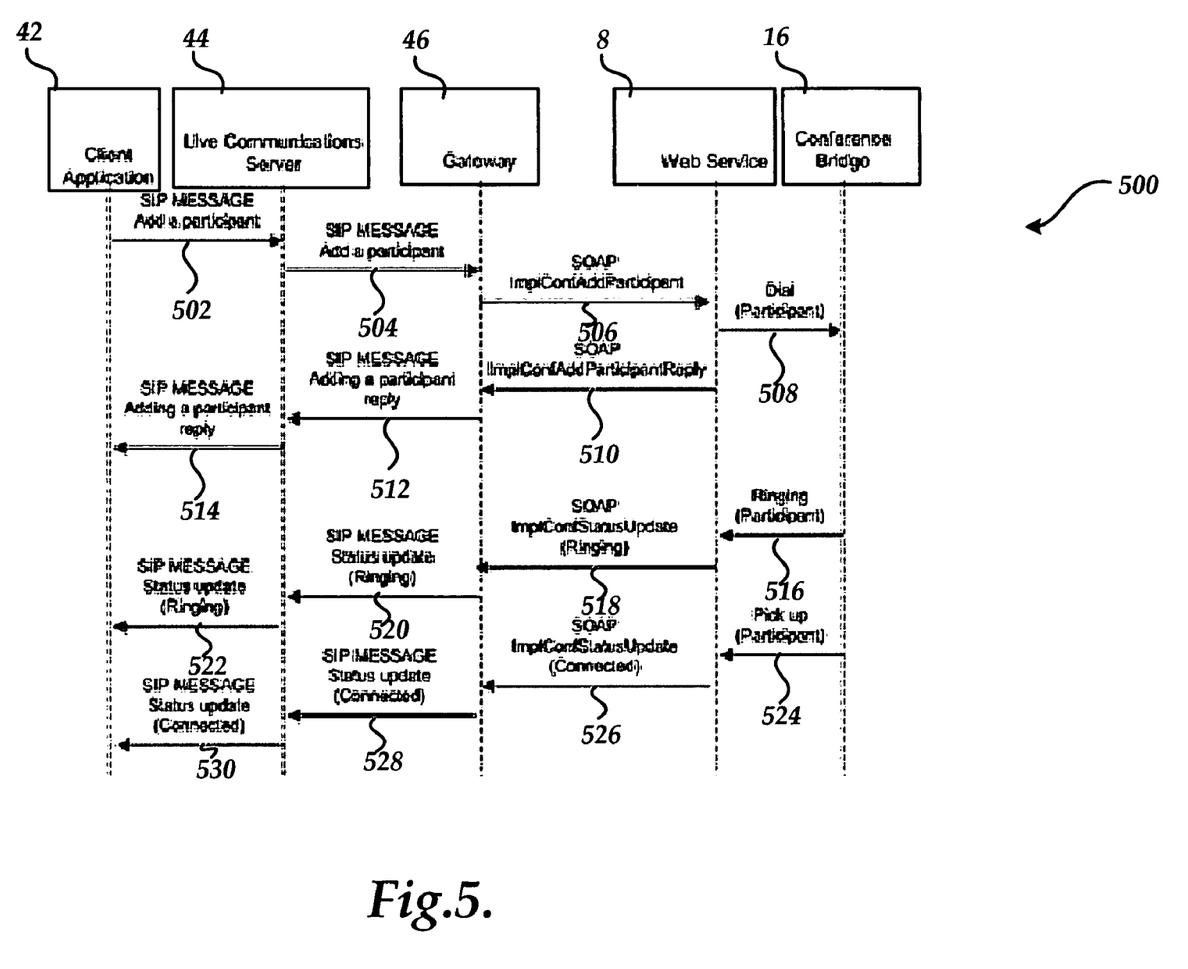

FIG. 5 illustrates a process 500 for adding additional participants to an existing telephone conference created in the manner described above with reference to FIG. 4. In particular, operations 502-508 are utilized to transmit a message from the IM client application 42 to the conference bridge 16 to add a participant to the existing telephone conference. In particular, the message from the client application 42 to the gateway application 46 may comprise a SOAP formatted XML message transmitted over the SIP protocol. The message may comprise a web services request between the gateway 46 and the web service 8. A message from the web service 8 to the conference bridge 16 may be transmitted over a proprietary interface. A reply may then be transmitted from the web service 8 to the client application 42 at operations 510-514. These steps are performed in the manner described above with reference to operations 410-414.

Indications may also be provided from the conference bridge 16 to the IM client application 42 indicating that a call has been made and is in a ringing state and that a telephone call has been picked up by a participant. These processes are performed at operations 516-522 and 524-530, respectively. These operations are performed in the same manner as the corresponding operations 416-422 and 424-430 described above with reference to FIG. 4. It should be appreciated that the process 500 illustrated in FIG. 5 may be repeated any number of times to add the desired number of participants to the telephone conference.

Figure 6:
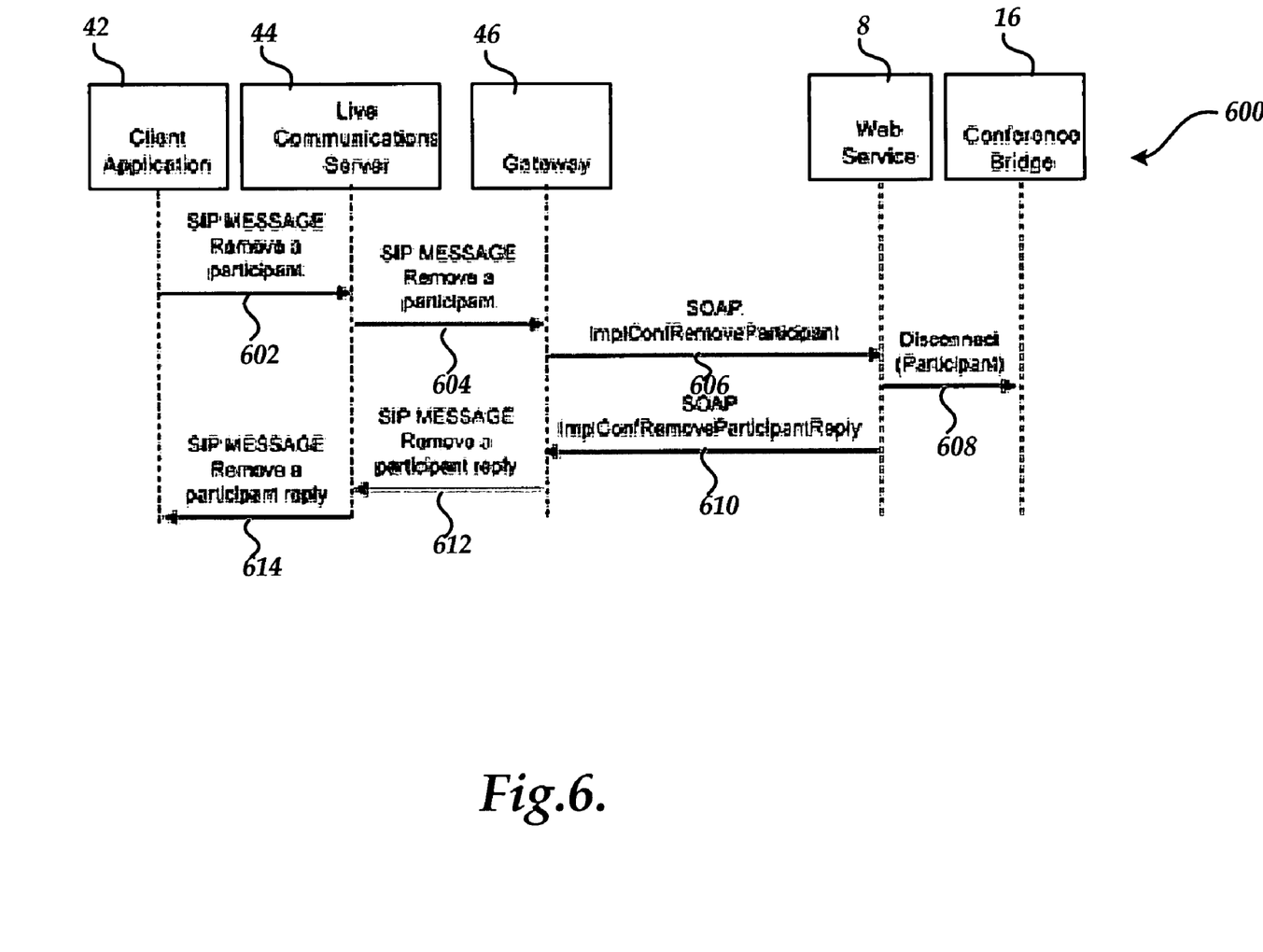

Referring now to FIG. 6, an illustrative process 600 will be described for removing a participant from a telephone conference. As shown in FIG. 6, a request may be received at the IM client application 42 to disconnect a participant from a telephone conference. Such a request may be provided through the interface described above with respect to FIG. 3. In response to receiving such a request, the IM client application 42 transmits a message to the IM server application 44 at operation 602. The message comprises an XML formatted SOAP request transmitted according to the SIP protocol that includes data identifying the participant to be removed and a request to remove the participant. At operation 604, the IM server application 44 transmits the message to the gateway application 46. The gateway application 46 extracts the data from the message and converts the data to a web services request. At operation 606, the gateway 46 transmits the web services request to the web service 8. In turn, the web service 8 transmits a request to the conference bridge 16 at operation 608 requesting that the identified participant be disconnected from the telephone conference.

A reply is generated by the web service 8 at operation 610 and transmitted to the gateway 46 via a web services request. At operation 46, the gateway converts the message to an XML message and transmits the message to the IM server application 44 via the SIP protocol at operation 612. In turn, the IM server application 44 transmits the SIP message to the client application 44 at operation 614. The client application 42 may then display an indication that the participant has been disconnected from the telephone conference.

Figure 7:
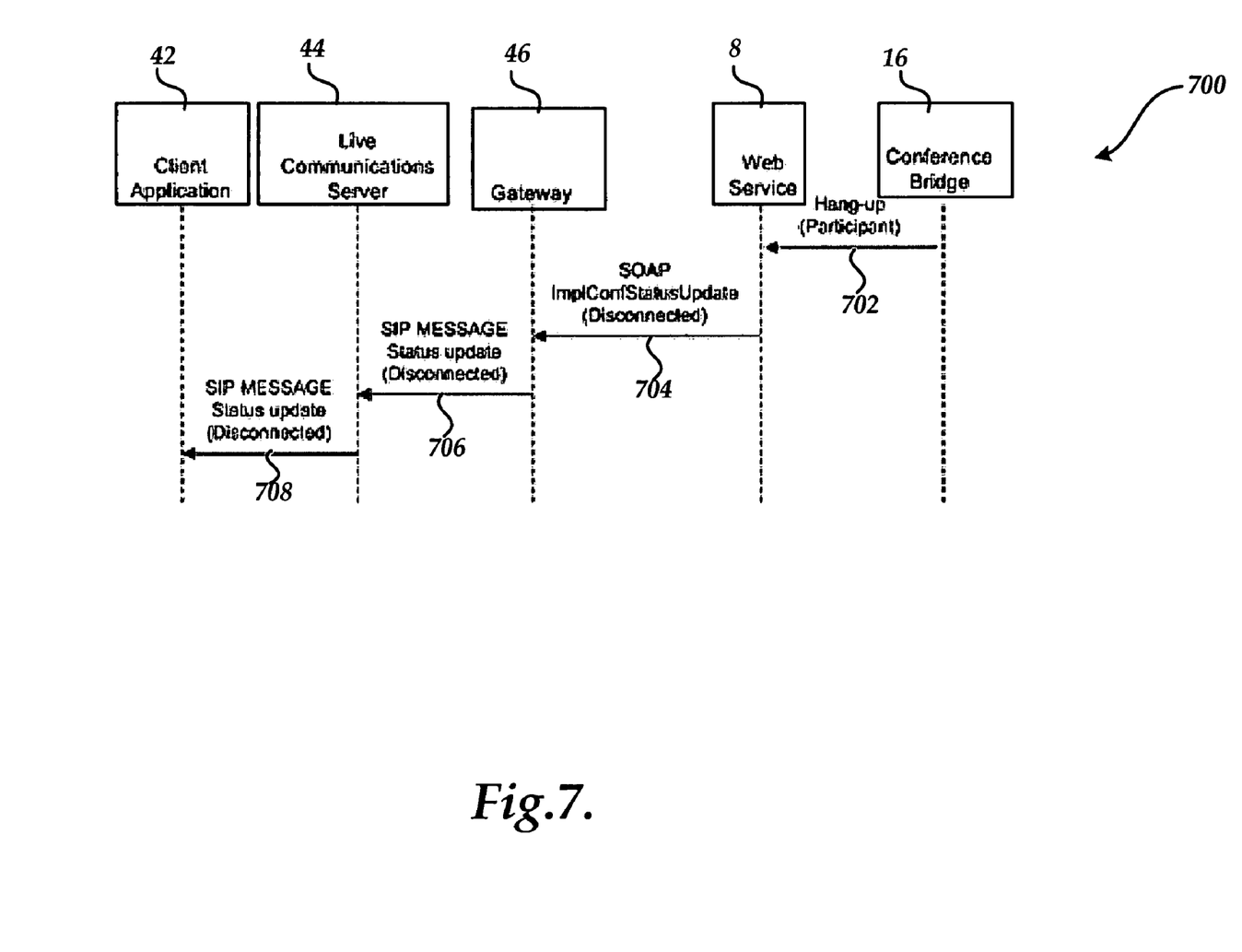

Referring now to FIG. 7, an illustrative process 700 for providing an indication that a participant in a telephone conference has disconnected will be described. The process 700 begins at operation 702, where the conference bridge 16 provides an indication to the conference web service 8 that a participant in the telephone conference has disconnected. In response, the web service 8 generates a web service request to the gateway 46 indicating that the participant has disconnected.

In response to receiving the indication, the gateway application 46 generates a SIP message directed toward the IM client application 42 and transmits the message to the IM server application 44 at operation 706. In response to receiving the message, the IM server application 44 transmits the message to the IM client application 42. A status indication may then be displayed by the IM client application 42 indicating that the participant has disconnected from the telephone conference.

Figure 8:
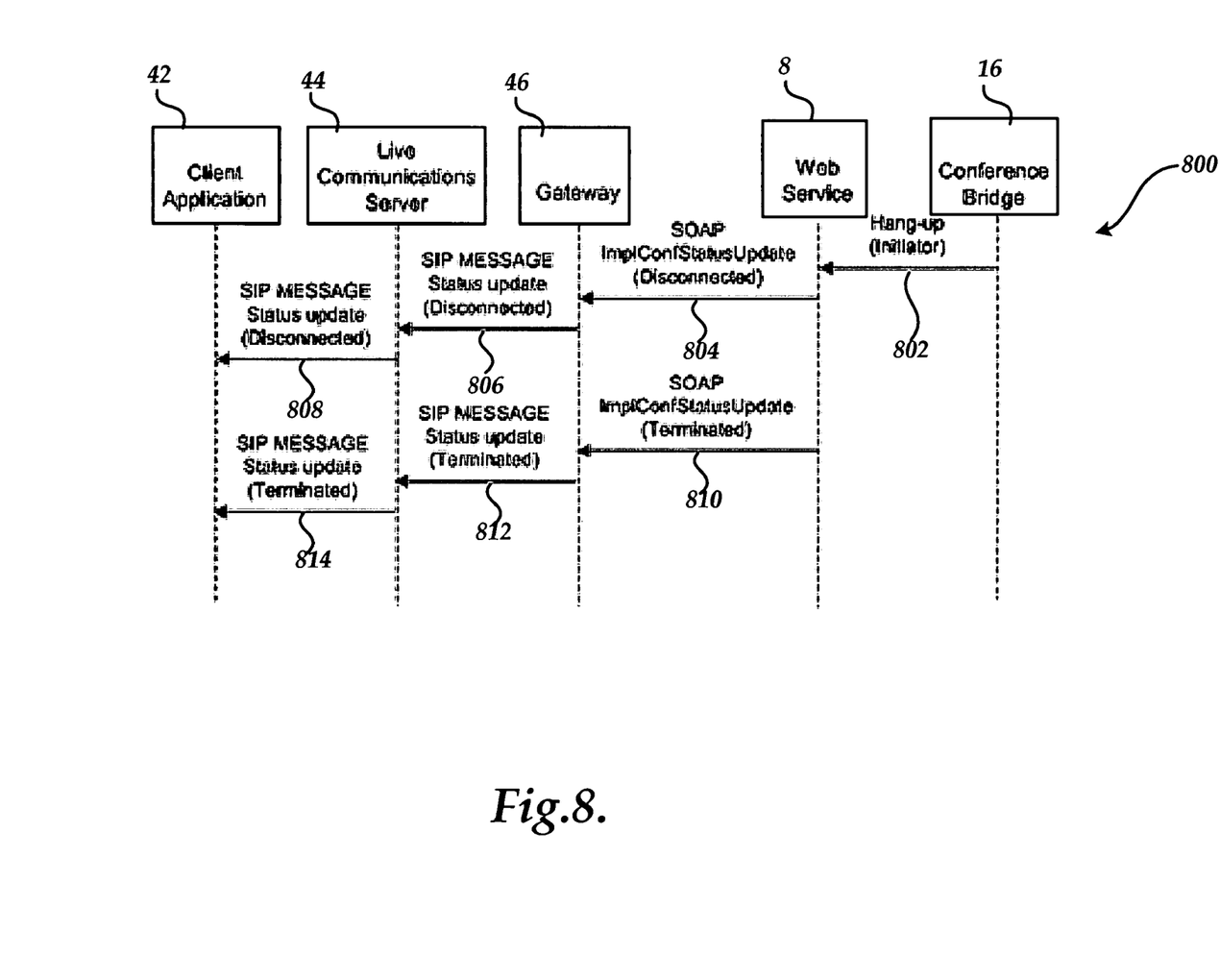

Referring now to FIG. 8, an illustrative process 800 will be described illustrating the operations performed when the initiator of a telephone conference disconnects from the telephone conference. If the initiator disconnects, the telephone conference is terminated. In particular, when an indication is received at the conference bridge 16 that the initiator of the telephone conference has hung up, a message is transmitted from the conference bridge 16 to the web service 8 at operation 802. In response, the web service 8 transmits a web services message to the gateway 46 indicating that the initiator of the telephone conference has disconnected. The gateway 46 converts the message into an XML message and transmits the message to the IM server application 44 via the SIP protocol. In turn, the IM server application 44 relays the message to the client application 42 at operation 808. Thereafter, a status message may be displayed by the IM client application 42 indicating that the telephone conference has been terminated. Additionally, the web service 8 transmits a web services message to the gateway 46 indicating that the conference has been terminated at operation 810. This message is converted to an SIP message and transmitted to the IM server application 44 at operation 812. The IM server application 44 then relays message to the client application 42 at operation 814.

Figure 9:
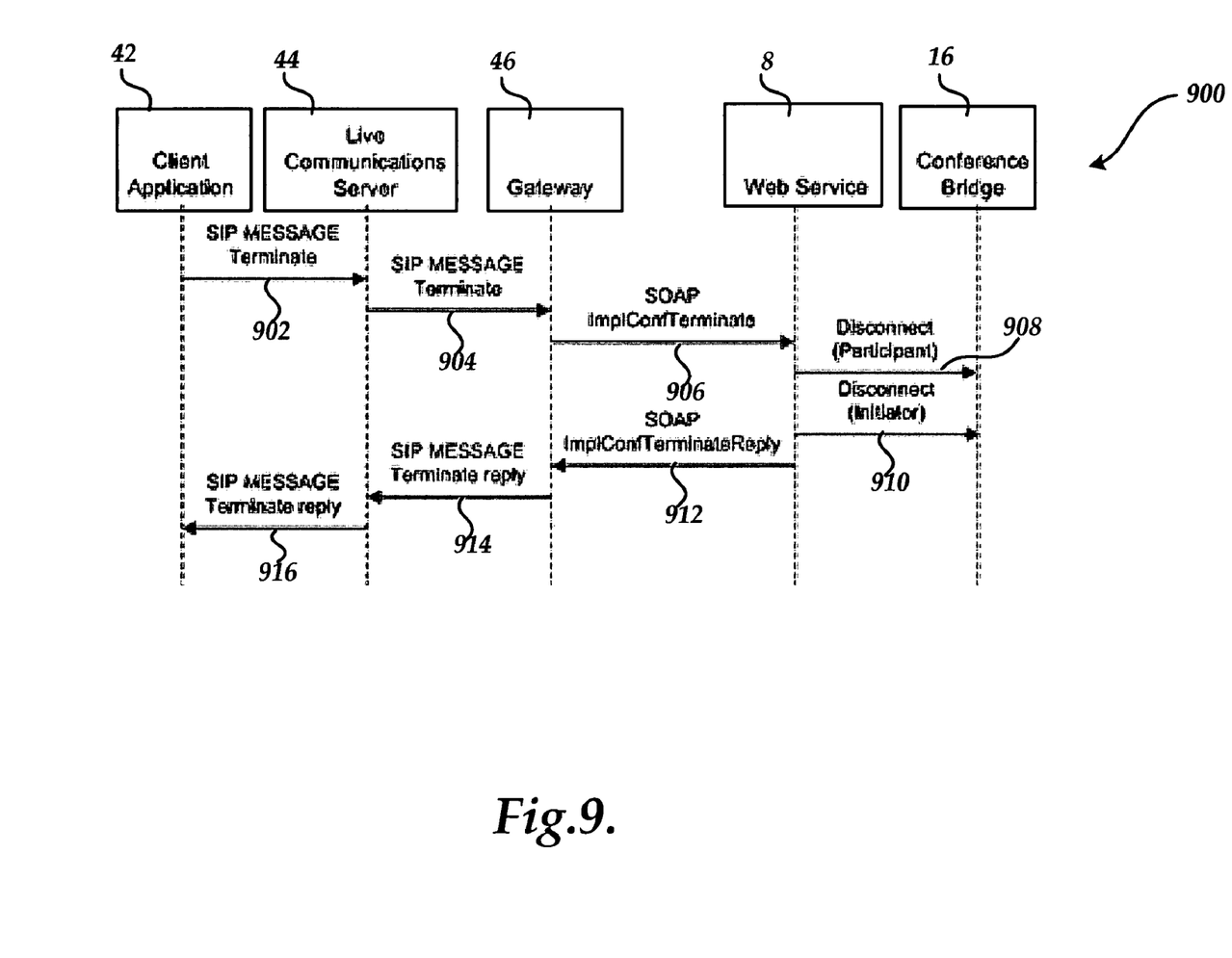

Referring now to FIG. 9, a routine 900 will be described illustrating a process for terminating a telephone conference in response to a request by the initiator of the telephone conference received at the IM client application 42. The process 900 begins at operation 902, where the request is received at the client application 42 and transmitted to the IM server application 44. In response to receiving the message, the IM server application 44 relays the message to the gateway 46 at operation 904. The gateway 46 converts the message to a web services request and transmits the message to the web service 8 at operation 906. At operation 908, one or more requests are transmitted by the web service 8 to the conference bridge 16 to disconnect each of the participants in the telephone conference. Once the participants have been disconnected, a message is transmitted by the web service 8 at operation 910 to disconnect the initiator of the telephone conference.

Once the participants and the initiator have been disconnected from the telephone conference, the web service 8 generates a web service message to the gateway 46 at operation 912 indicating that the telephone conference has been terminated. The gateway 46 converts the web services message into an XML formatted message and transmits the message over the SIP protocol to the IM server application 44 at operation 914. The IM server application 44 relays the message to the IM client application 42 at operation 916. A message may then be displayed through the user interface described above with reference to FIG. 3 indicating that the telephone conference has been terminated.

Figure 10:
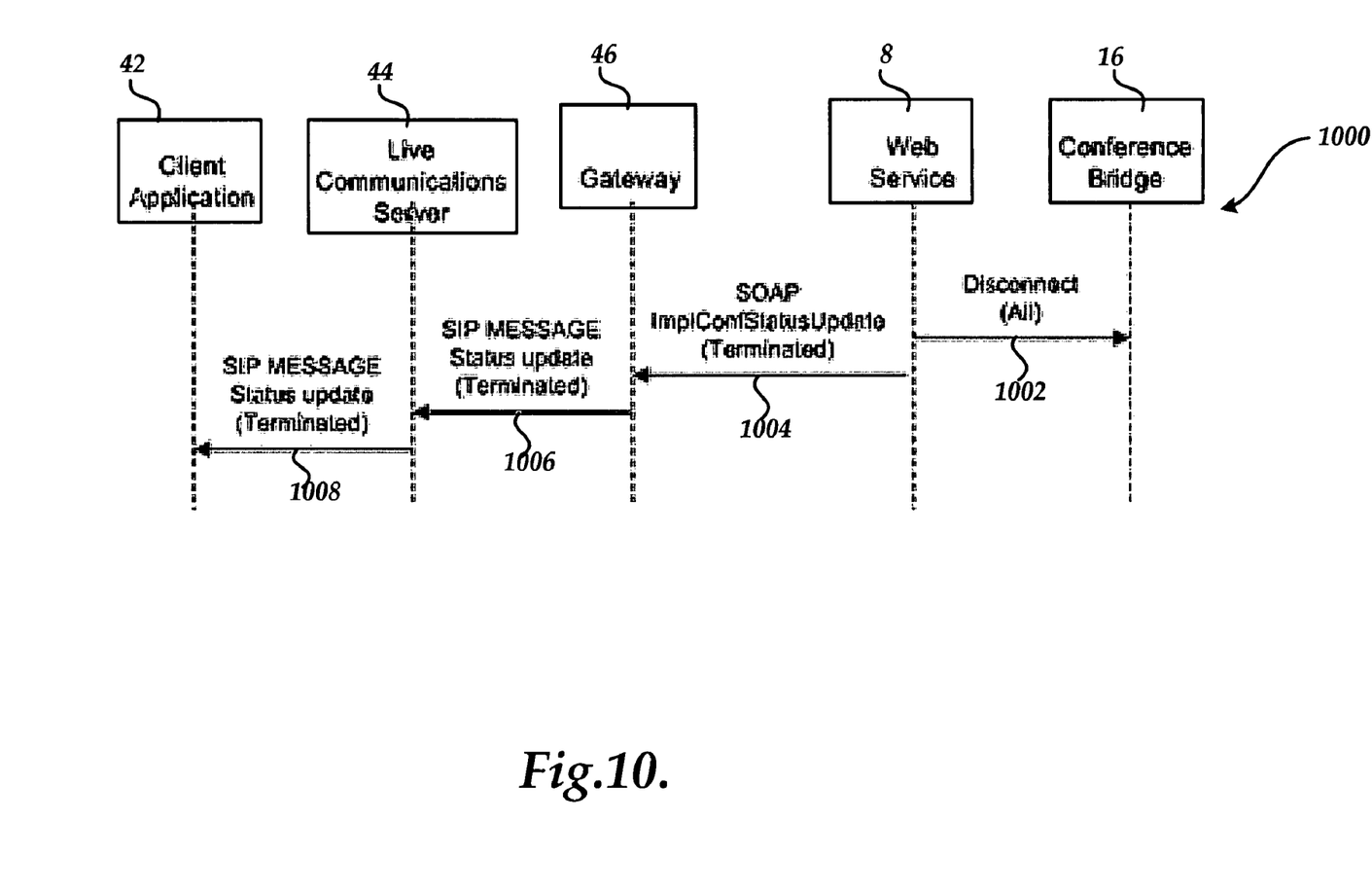

FIG. 10 illustrates the exchange of messages when a conference is terminated by a fatal error. For instance, if the application web service or conference bridge detects any kind of fatal error, such as the conference bridge crashing or automatically terminating the call due to inactivity, the web service 8 transmits a message to the conference bridge 16 indicating that all participants in the telephone conference should be disconnected at operation 1002. The web service 8 also transmits a web services message to the gateway 46 at operation 1004 indicating that the telephone conference has been terminated due to a fatal error. The gateway 46 converts the message to an XML formatted message and transmits the message to the IM server application 44 at operation 1006. The IM server application 44 then relays the message to the client application 42 at operation 1008. The IM client application 42 may then display an indication that the call has been terminated.

Based on the foregoing, it should be appreciated that the various embodiments of the invention include a method, system, apparatus, and computer-readable medium for providing an improved communications channel for initiating and managing telephone conferences. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for providing and utilizing an improved communications channel for establishing and maintaining a telephone conference, the method comprising:
    receiving at a client computer a request to initiate a telephone conference, said request identifying two or more participants for the telephone conference;
    in response to the request, transmitting an instant message including data for establishing the telephone conference between the participants to an instant messaging server computer;
    receiving the instant message at the instant messaging server computer;
    forwarding the instant message to a telephone conference gateway computer;
    receiving the instant message at the telephone conference gateway computer, extracting from the instant message the data for establishing the telephone conference, creating a web services request based on the data, and executing the web services request in order to establish the telephone conference; and
    receiving at the telephone conference gateway computer an indication that a telephone call has been placed to one of the participants and that the telephone call is in a ringing state.

2. The method of claim 1, wherein the instant message comprises a message formatted according to a session initiation protocol.

3. The method of claim 2, wherein the data for establishing the telephone conference comprises extensible markup language data formatted according to a simple object access protocol.

4. The method of claim 3, wherein the instant messaging server computer is operative to authenticate the client computer and the telephone conference gateway computer.

5. The method of claim 4, wherein extracting from the instant message the data for establishing the telephone conference comprises extracting the extensible markup language data and wherein creating a web services request based on the data comprises created a web services request based on the extensible markup language data.

6. The method of claim 5, wherein executing the web services request in order to establish the telephone conference comprises transmitting the web services request to a conference web service, and wherein the conference web service is operative to cause a conference bridge to initiate the telephone conference according to the extensible markup language data.

7. The method of claim 1, further comprising:
    converting the indication that a telephone call has been placed to an instant message at the telephone conference gateway, the instant message including data indicating that the telephone call is in a ringing state;

transmitting the instant message to the instant messaging server computer;

forwarding the instant message from the instant messaging server computer to the client computer; and receiving the instant message at the client computer, extracting from the instant message the data indicating that the call is in a ringing state, and displaying data at the client computer indicating that the call is in a ringing state.

8. The method of claim 7, further comprising:

receiving at the telephone conference gateway an indication that the telephone call has been answered by one of the participants, the indication being received as a web services request;

converting the indication to an instant message at the telephone conference gateway, the instant message including data indicating that the telephone call has been answered;

transmitting the instant message to the instant messaging server computer;

forwarding the instant message from the instant messaging server computer to the client computer; and receiving the instant message at the client computer, extracting from the instant message the data indicating that the call has been answered, and displaying data at the client computer indicating that the call has been answered.

9. The method of claim 8, further comprising:

receiving at the client computer a request to disconnect one of the participants from the telephone conference;

in response to the request, transmitting an instant message including data for requesting that the participant be disconnected from the telephone conference;

receiving the instant message at the instant messaging server computer, and forwarding the instant message to the telephone conference gateway computer;

receiving the instant message at the telephone conference gateway computer, extracting from the instant message the data requesting that the participant be disconnected, creating a web services request based on the data, and executing the web services request in order to disconnect the participant from the phone conference.

10. The method of claim 8, further comprising:

receiving at the telephone conference gateway an indication that a participant has disconnected from the telephone conference, the indication being received as a web services request;

converting the indication to an instant message at the telephone conference gateway, the instant message including data indicating that the participant has disconnected from the telephone conference;

transmitting the instant message to the instant messaging server computer;

forwarding the instant message from the instant messaging server computer to the client computer; and receiving the instant message at the client computer, extracting from the instant message the data indicating that the participant has disconnected from the telephone conference, and displaying data at the client computer indicating that the participant has disconnected.

11. A system for providing and utilizing an improved communications channel for establishing and maintaining a telephone conference, the system comprising:

a client application program operative to:

transmit an instant message to an instant messaging server computer, the instant message including data requesting that a telephone conference between two or more participants be established, and display data extracted from an instant message received at the client computer indicating that a placed telephone call associated with the requested telephone conference is in a ringing state;

a gateway application program operative to:

receive the instant message from the instant messaging server computer, extract from the instant message the data requesting that a telephone conference be established, create a web services request based on the data, transmit the web services request to a network device capable of establishing the telephone conference, receive an indication that a telephone call has been placed to one of the participants and that the telephone call is in a ringing state, convert the indication that a telephone call has been placed to the instant message indicating that a placed telephone call associated with the requested telephone conference is in a ringing state, and transmit the instant message to the instant messaging server computer, wherein the instant messaging server computer is operative to forward the instant message to the client application program.

12. The system of claim 11, wherein the messages transmitted between the client application program and the instant messaging server computer are formatted according to a session initiation protocol.

13. The system of claim 12, wherein the data requesting that a telephone conference between two or more participants be established comprises extensible markup language data formatted according to a simple object access protocol.

14. The system of claim 13, wherein the messages transmitted between the gateway application program and the instant messaging server computer are formatted according to the session initiation protocol.

15. The system of claim 14, wherein the messages transmitted between the gateway application program and the network device capable of establishing the telephone conference are web services requests.

16. The system of claim 15, wherein the gateway application program is operative to receive a web services request indicating that a participant has been added to a telephone conference or that a participant has exited from a telephone conference, and to transmit an instant message formatted according to the session initiation protocol to the instant messaging server computer indicating the addition or removal of the participant from the telephone conference.

17. The system of claim 16, wherein the client application program is operative to receive a request to add a participant to a telephone conference or to remove a participant from a telephone conference and to transmit an instant message formatted according to the session initiation protocol to the gateway application program requesting the addition or removal of the participant from the telephone conference.

18. A system for providing and utilizing an improved communications channel for establishing and maintaining a telephone conference, the system comprising:

a first memory storage; and a first processing unit coupled to the first memory storage, wherein the first processing unit is operative to:

receive a request to initiate a telephone conference, said request identifying two or more participants for the telephone conference, and in response to the received request, transmit an instant message including data for establishing the telephone conference between the participants, a second memory storage; and a second processing unit coupled to the second memory storage, wherein the second processing unit is operative to:

receive the instant message, and forward the instant message, a third memory storage; and a third processing unit coupled to the third memory storage, wherein the second processing unit is operative to:

receive the forwarded instant message, extract from the forwarded instant message the data for establishing the telephone conference, create a web services request based on the data, execute the web services request in order to establish the telephone conference, and receive an indication that a telephone call has been placed to one of the participants and that the telephone call is in a ringing state.

19. The system of claim 18, wherein the instant message comprises a message formatted according to a session initiation protocol.

20. A method for providing and utilizing an improved communications channel for establishing and maintaining a telephone conference, the method comprising:

transmitting an instant message to an instant messaging server computer, the instant message including data requesting that a telephone conference between two or more participants be established;

displaying data extracted from an instant message received at the client computer indicating that a placed telephone call associated with the requested telephone conference is in a ringing state;

receiving the instant message from the instant messaging server computer;

extracting from the instant message the data requesting that a telephone conference be established;

creating a web services request based on the data;

transmitting the web services request to a network device capable of establishing the telephone conference;

receiving an indication that a telephone call has been placed to one of the participants and that the telephone call is in a ringing state;

converting the indication that a telephone call has been placed to the instant message indicating that a placed telephone call associated with the requested telephone conference is in a ringing state; and transmitting the instant message to the instant messaging server computer, wherein the instant messaging server computer is operative to forward the instant message to the client application program.

\* \* \* \* \*